United States Patent [19]

Nunoshita et al.

[11] 4,092,060

[45] May 30, 1978

[54] THIN FILM OPTICAL SWITCHING DEVICE

[75] Inventors: Masahiro Nunoshita; Yoshinori Nomura, both of Amagasaki, Japan

[73] Assignee: Mitsubishi Denki Kabushiki Kaisha, Tokyo, Japan

[21] Appl. No.: 665,434

[22] Filed: Mar. 10, 1976

[30] Foreign Application Priority Data

Apr. 2, 1975 Japan .................................. 50-40713

[51] Int. Cl.² .............................................. G02B 5/14
[52] U.S. Cl. .................................. 350/96.13; 350/358
[58] Field of Search ........................ 350/96 WG, 96 C

[56] References Cited

U.S. PATENT DOCUMENTS 3,753,157  8/1973  Ash et al. ................... 350/96 WG X
3,856,378  12/1974  Brandt et al. .................. 350/96 WG

OTHER PUBLICATIONS

Kuhn et al., article in Applied Physics Letter, Sep. 15, 1970, pp. 265–267.
Shah article in Applied Physics Letter, Jul. 15, 1973, pp. 75–77.
Ohmachi article in Journal of Applied Physics, Sep. 1973, pp. 3928–3933.
Suematsu et al., article in IEEE Journal of Quantum Electronics, QE-10, Feb. 1974, pp. 222–229.
Leon et al., article in IBM Tech. Disc. Bull., Jan. 1973, p. 2630.

*Primary Examiner*—John K. Corbin
*Assistant Examiner*—Rolf Hille

[57] ABSTRACT

A thin-film optical switching device has a substrate of fused quartz, an optical slab waveguide or Corning glass No. 7059, a thin film crossing a portion of the length of the waveguide, and an interdigital transducer on the substrate for generating an elastic surface wave to propagate it through the thin film. The optical waveguide, and thin film have respective parameters such that almost all energy of an optically guided wave and the elastic surface wave are concentrated into the thin film while the optically guided wave within the thin film undergoes acousto-optical interaction, that is, Bragg diffraction.

10 Claims, 5 Drawing Figures

THIN FILM OPTICAL SWITCHING DEVICE

BACKGROUND OF THE INVENTION

This invention relates to improvements in a thin-film optical switching device.

In order to put systems for processing and communicating optical information by the use of laser light to practical use, the optical circuit elements should be combined into an integrated circuit. If mechanical means for rotating a mirror or a prism is unavailable, it is possible to modulate or deflect an optical wave by changing the refractive index of the particular medium through which the optical wave travels. This measure can be achieved by utilizing the electro-optical effect, magneto-optical effect or acousto-optical effect according to which the substance involved changes in refractive index. For example, there have been already proposed thin-film optical switching and modulating devices utilizing such effects.

Among them thin-film optical switching devices utilizing the acousto-optical effect are promising because they can employ a substrate of noncrystalline material, for example, glass, as long as the substrate is operatively associated with a suitable transducer for generating an elastic surface wave and because there is no necessity for using a thin film composed of a special electro-optical or magneto-optical crystal for the wave guide and the substrate. Among optical switching devices utilizing an elestic surface wave there are well known (a) optical switching devices including a quartz substrate and a thin-film optical waveguide formed by sputtering Corning glass No. 7059 upon the substrate, (b) those including a substrate of ferroelectric lithium niobate ($LiNbO_3$) and a thin-film optical waveguide formed by sputtering chalcognide glass on the substrate or by diffusing a suitable metal or its oxide into the surface layer of the substrate, (c) those including a substrate made of fused quartz or glass available under the trade mark PYREX and an electro-mechanical transducer with interdigital electrodes and an optical waveguide each formed of a thin film of zinc oxide (ZnO) disposed on the substrate.

The devices (a) have had low light deflection or diffraction efficiency, and the devices (b) have had a high optical propagation loss while they have not been suitable for efficiently coupling to other optical circuit elements not requiring a substrate of ferroelectric crystals. Also the devices (c) have had a high optical propagation loss and a low light diffraction efficiency. Thus all the devices as above described have been disadvantageous in that it is difficult to simultaneously have low propagation and coupling loss and high diffraction efficiencies. In other words, such devices have not been practically available far integrated optical circuits.

Accordingly it is a general object of the present invention to eliminate the disadvantages of optical switching elements of the conventional types as above described.

It is an object of the present invention to provide a new and improved thin-film optical switching device having a low light propagation loss and high light diffraction efficiency yet which is still easy to couple to and integrate with other thin-film optical circuit elements.

SUMMARY OF THE INVENTION

The present invention provides a thin-film optical switching device comprising a substrate, an optical slab waveguide disposed on the substrate, and a thin film overlapping on at least one portion of the optical slab waveguide. The thin film is formed of a transparent material having a higher refractive index and greater acousto-optical figure-of-merit than the material forming the optical waveguide. The optical waveguide and thin film have respective refractive indices and film thicknesses determined in accordance with the wavelength of light used with the device so that that portion of the optical slab waveguide overlaid by the thin film has a propagation constant which is as high as possible. Further an electro-mechanical transducer is disposed on the substrate to generate an elastic surface wave for propagating along the surface of the thin film. In the device thus formed, an optical guided wave propagating through the optical waveguide is introduced into the thin film through that portion of the optical waveguide overlaid by the thin film. Within the thin film the elastic surface wave from the transducer acts on the introduced optical wave to deflect the path of the optical guided wave whereby the switching of the optical guided wave is accomplished with both a low propagation loss and a high light diffraction efficiency.

BRIEF DESCRIPTION OF THE DRAWINGS

The present invention will become more readily apparent from the following detailed description taken in conjunction with the accompanying drawings in which.

DESCRIPTION OF THE PREFERRED EMBODIMENT

Figure 1:
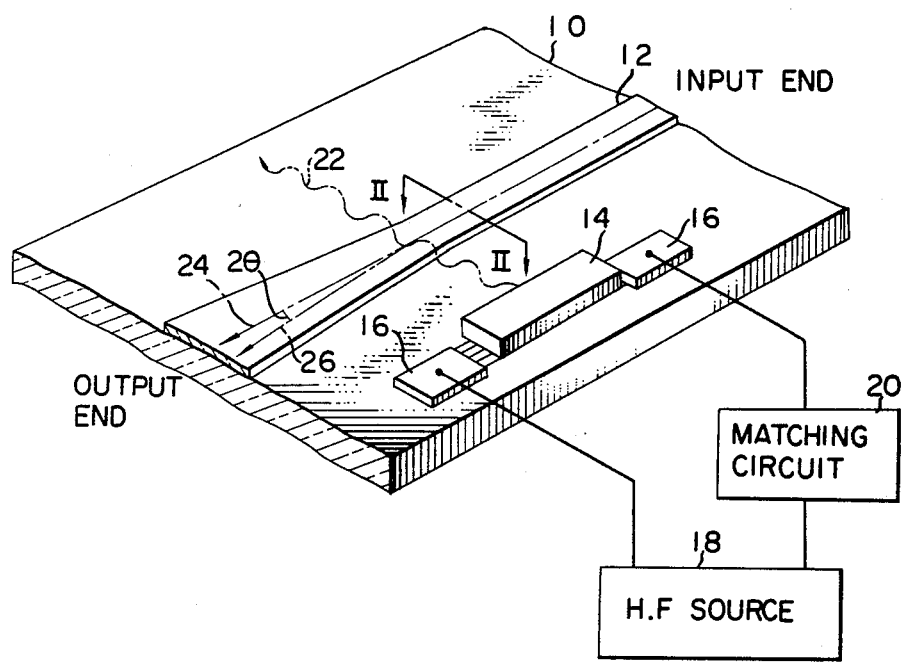
FIG. 1 is a fragmental perspective view of a thin-film optical switching device constructed in accordance with the principles of the prior art with an associated electric circuit illustrated in the form of a block diagram.
Figure 2:
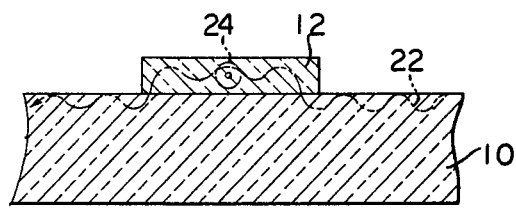
FIG. 2 is a fragmental cross sectional view taken along the line II—II of FIG. 1.

Referring now to the drawings in detail, FIGS. 1 and 2 show a thin-film optical switching device constructed in accordance with the principles of the prior art and belonging to the category of the devices (c) as above described. The arrangement illustrated comprises a substrate 10 formed, for example, of fused quartz, an optical slab waveguide 12 disposed on one surface of the substrate 10 along the longitudinal axis thereof and extending throughout the length thereof. The optical waveguide 12 includes one half, in this case, a lefthand half as viewed in FIG. 1 having a uniform width and the other or righthand half flared toward its free end. The optical waveguide 12 is a thin-film formed by sputtering Corning glass No. 7059 onto the substrate 10 by a photolithographic technique. The composition of Corning glass No. 7059 is as disclosed by T. Nishimura et al. in an article entitled "Thin Glass Film Optical Waveguides", Reports of Researches read in the subcommittee meeting of Electronic Quantum-Statistical Theory of Matter held on July 25, 1973 in Tokyo. The arrangement further includes a rectangular thin film 14 of any suitable piezoelectric material such as zinc oxide (Zn), zinc sulfide (ZnS) or the like disposed on substrate 10 adjacent to one longer edge. The piezoelectric thin film 14 serves as an electro-mechanical transducer for generating an elastic surface wave.

As shown in FIG. 1, a pair of interdigital electrodes 16 are disposed on the one surface of the substrate 10 and connected to the transducer 14 and electrically connected across a source of high frequency voltage 18 through a matching circuit 20.

In operation a high frequency voltage from the source 18 is applied across the electrodes 16 and therefore to the interdigital transducer 14 through the matching circuit 20 to generate an elastic surface wave 22 and propagate it along the surface of the substrate 10 substantially perpendicularly to the longitudinal axis of the optical waveguide 12. The elastic surface wave has 90% of its strain energy concentrated within a depth on the order of a wavelength thereof from the surface of the substrate 10. The elastic surface wave has a wavelength $\Lambda$ defined by $\Lambda = V_s/f$ where $V_s$ designates the sound velocity of the elastic surface wave, and $f$ designates the frequency of the high frequency voltage applied across the transducer electrodes 16. When the frequency $f$ is tuned to the central frequency $f_o$ of the interdigital electrode 16, the elastic surface wave is generated with a maximum efficiency. At that time the wavelength $\Lambda$ thereof is equal to the finger period $d$ of the interdigital electrode 16.

An elastic strain wave on the surface of the substrate 10, that is, the elastic surface wave, propagates across the optical waveguide 12 to cause a periodic variation in the refractive index of the optical waveguide 12 due to the photoelastic effect of the surface wave on the material of the waveguide. This periodic variation in the refractive index functions as a diffraction grating with respect to an optically guided wave 24 propagating within the optical waveguide 12 through one end labelled INPUT END.

The diffraction of light resulting from such a diffraction grating is sorted into a Roman-Nath diffraction and a Bragg diffraction. Either of these two types of diffraction of light is characterized by a value of a parameter Q expressed by the following equation:

$$Q = 2\pi \lambda o L/n\Lambda^2 \quad (1)$$

where $n$ designates the effective refractive index for an optically guided wave, $\Lambda$ the wavelength of an elastic surface wave, $\lambda o$ the wavelength of light in a vacuum and L designates the aperture length of a transducer such as the interdigital transducer 14 that is, the width over which an elastic surface wave such as the wave 22 is generated and propagated. If the parameter Q is caused to be equal to or greater than $4\pi$ then Bragg diffraction can be caused. Unlike the Raman-Nath diffraction, this Bragg diffraction makes it possible to deflect the optically guided wave 24 to produce a diffracted optical wave 26 with a diffraction efficiency of 100%. Therefore, causing Q to have a value $Q \geq 4\pi$ is preferable in order to produce Bragg diffraction and thus produce highly efficient optical switching devices.

Upon the occurrence of the Bragg diffraction, the optical diffraction efficiency is maximum when the angle $2\theta$ between the optical guided wave 24 and the diffracted optical wave 26 fulfils the following requirement for the Bragg diffraction:

$$\sin \theta = \lambda o/2n\Lambda \quad (2)$$

The diffraction efficiency $\eta$ with which the optical guided wave 24 being propagated through the optical waveguide 12 undergoes the Bragg diffraction is expressed by $$\eta = \sin^2 [(\pi/\lambda_o) (LMP_aF^2/2W)^{\frac{1}{2}}] \quad (3)$$

where $P_a$ designates a power of an elastic surface wave 24, F an overlap integral of transverse distribution functions of the optical guided wave 24, the diffracted optical wave 26 and the elastic surface wave 22, and M designates an acousto-optical figure-of-merit. If the optical waveguide 12 has a thickness W sufficiently greater than a cut-off film thickness for the optically guided wave, then the overlap integral F is substantially one. The acousto-optical figure-of-merit M is a value characteristic of the medium involved and is the most important factor for determining the efficiency with which an optical wave is deflected due to the acousto-optical effect. The value M is expressed by the following equation $$M = n^6 p^2/\rho V_s^3 \quad (4)$$

where $p$ and $\rho$ respectively designate the photoelastic constant and the volume density of the particular medium in which the acousto-optical interaction is caused.

In order to provide acousto-optical deflection switches having a high light diffraction efficiency, it is generally necessary to cause the acousto-optical interaction within materials having a high value of M. In other words, it is necessary to form thin-film optical waveguides of materials having a high value of M. Any material having a high value of M exhibits fairly high propagation losses at wavelengths of light from semiconductor laser diodes, YAG lasers or HeNe lasers.

On the other hand, optical waveguides can be formed of materials capable of reducing the in propagation loss to, for example, 0.1 db/cm. Such optical waveguides are typically formed on a substrate of fused quartz by sputtering Corning a glass having the composition 61.0 mol % of $SiO_2$, 10.0 mol % of $Al_2O_3$, 19.0 mol % of $B_2O_3$ and 10.0 mol % of BaO, one such glass being glass No. 7059 in a thin film upon the substrate. Any optical waveguides thus formed have a small value of M and a light deflection efficiency as low as at most 60 percent in terms of ordinary acoustic power.

Thus conventional optical switching devices such as above described have not had both high light diffraction efficiency and low light propagation loss.

Figure 3:
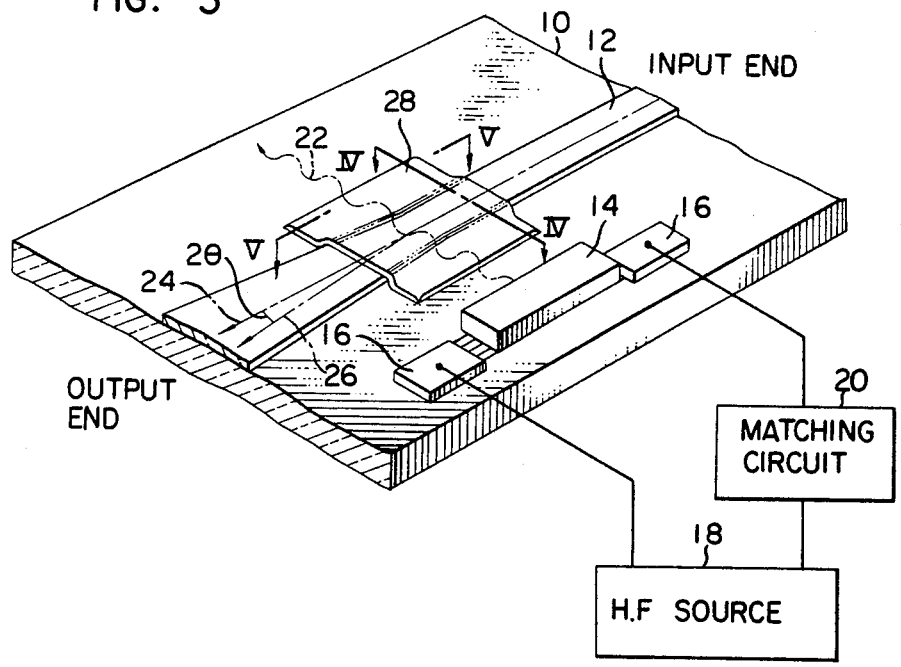
FIG. 3 is a fragmental perspective view of a thin-film optical switching device constructed in accordance with the principles of the present invention with an associated electric circuit illustrated in the form of a block diagram.

Referring now to FIG. 3 wherein like reference numerals designate components identical or similar to those shown in FIG. 1, there is illustrated a thin-film optical switching device constructed in accordance with the principles of the present invention. The arrangement illustrated is different from that shown in FIG. 1 only in that in FIG. 3 a thin film 28 of rectangular shape is disposed on the surface of the substrate 10 so as to cover that portion of the optical waveguide 12 located on the path of propagation of the elastic surface wave. In FIG. 3 the thin film 28 is shown as including a greater portion overlying the flared portion of the optical waveguide 12 and the remaining portion thereof overlying the substantially uniform width portion of the waveguide. The thin film 28 is formed of any suitable material having a high value of M, for example, chalcogenide or arsenic sulfide (AsS$_x$) glass where $x$ is a value of from 3 to 7. It is to be noted that the thin film 28 has both a width L required for effecting the acousto-optical interaction between the same and the adjacent portion of the optical waveguide 12 and a thickness W$_2$ required for transferring almost all the energy of the guided light 24 from the optical waveguide 12 to the thin film 28. The dimensions L and W$_2$ are designated in FIG. 5.

The condition for transferring a TEo mode guided wave from that portion of the optical waveguide 12 overlaid by the thin film 28 to the latter is obtained from the following equation.

$$\frac{\Gamma_2+\Gamma_3}{\Gamma_2-\Gamma_3} = \frac{(\Gamma_1-\Gamma_2)(\Gamma_0+\Gamma_1)e^{\Gamma_1 W_1} + (\Gamma_1+\Gamma_2)(\Gamma_0-\Gamma_1)e^{-\Gamma_1 W_1}}{(\Gamma_1+\Gamma_2)(\Gamma_0+\Gamma_1)e^{\Gamma_1 W_1} + (\Gamma_1-\Gamma_2)\Gamma_0-\Gamma_1)e^{-\Gamma_1 W_1}} e^{-2\Gamma_2 W_2} \quad (5)$$

$$\Gamma_j = \sqrt{(\beta^2 - n_j^2 k_o^2)}, \text{ where } j = 0, 1, 2, 3$$

The parameters appearing in the above equation are thus defined as follows:

$n_o$ = refractive index of substrate 10
$n_1$ = refractive index of optical waveguide 12
$n_2$ = refractive index of thin film 28
$n_3$ = refractive index of medium such as air contacted by upper surface of thin film 28
$W_1$ = thickness of optical waveguide 12
$\beta$ = propagation constant of optical guided wave 24
$k_o$ = propagation constant of light in vacuum If the $n_1$, $n_2$, W$_1$ and W$_2$ are selected according to $e =$ base for Napiorian logarithms the relationship $n_1 < \beta\lambda < n_2$ then the optically guided light 24 has the energy thereof transferred to the thin film 28 and is concentrated in the latter.

Also for the propagation of the elastic surface wave 22, the thin film 28 is preferably of a material which not only has a high acousto-optical figure-of-merit but also a lower velocity of sound therein than the materials of both the substrate 10 and the optical waveguide 12.

Figure 5:
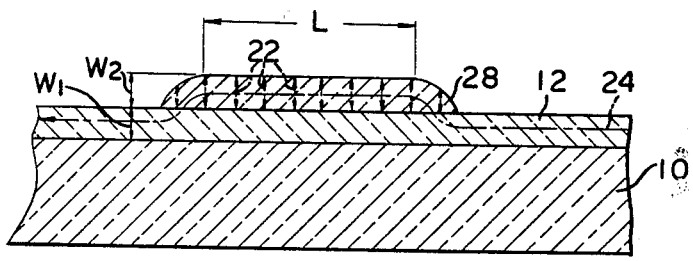
FIG. 5 is another fragmental cross sectional view taken along the line V—V of FIG. 3.

Further the optical guided wave 24 propagating through the optical waveguide 12 has a waveguide mode as determined by the refractive index $n_1$ and the film thickness W$_1$ of the optical waveguide 12. In order to effectively transfer optical energy to the thin film member 28, the refractive index $n_2$ and film thickness W$_2$ of the thin film 28 are required to be selected with reference to the refractive index $n_1$ and film thickness W$_1$ of the optical waveguide 12 while being suitably sloped at the upstream and downstream edges of the thin film 28 in a direction in which the optically guided wave 24 travels within the optical waveguide 12 as best shown in FIG. 5. It has been found that with an optical waveguide 12 formed by sputtering Corning glass No. 7059 (the refractive index $n_1$ of which is 1.53 at a wavelength of 8700 of light in a vacuum) to a film thickness W$_1$ of 1.7 microns on a substrate 10 made of fused quartz having a refractive index $n_o$ of 1.452 at the same wavelength of light, a satisfactory result is obtained with a thin film 28 formed of a diarsenic pentasulfide (As$_2$S$_5$) evaporated film having a refractive index $n_2$ of 2.32 at the same wavelength of light, a thickness W$_2$ of 2000 A and a slope of 1/1000 or less.

Figure 4:
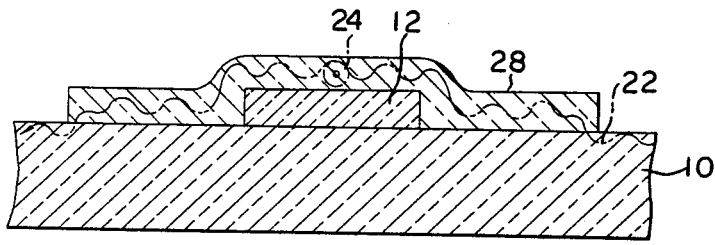
FIG. 4 is a fragmental cross sectional view taken along the line IV—IV of FIG. 3.

In operation, the elastic surface wave 24 from the transducer 16 propagates from the righthand portion as viewed in FIG. 4 of the surface portion of the substrate 10 into the thin film 28 as shown by the meandering dotted curve in FIG. 4. The elastic surface wave 22 transferred to the thin film 28 exerts the acousto-optical effect on the optically guided wave 24 at that time transferred to the thin film 28 as above described. This results in the optically guided wave 24 changing to a diffracted optical wave 26 due to the Bragg diffraction as in the arrangement shown in FIGS. 1 and 2.

Also as shown at dotted and dashed lines in FIG. 5, almost all the energy of the optically guided wave 24 from the righthand portion as viewed in FIG. 5 of the optical waveguide 12 is transferred to the thin film 28. Within the thin film 28 the transferred optical energy is affected by the elastic surface wave 22 as above described after which the affected optical wave is transferred back to the lefthand portion as viewed in FIG. 5 of the optical waveguide 12. This path of propagation of the guided wave 24 is also shown by the dotted and dashed line in FIG. 5.

The operation of the arrangement as shown in FIGS. 3, 4 and 5 will now be described in more detail. It is assumed that the high frequency source 18 is in its OFF state in which the interdigital electrode-transducer arrangement 14 – 16 generates no elastic surface wave and therefore no surface wave is supplied to the thin film 28. Under the assumed condition, the optically guided wave 24 introduced into the optical waveguide 12 through the righthand end as viewed in FIG. 3 labelled INPUT END is transferred to the thin film 28 as above described. Because of the absence of the elastic surface wave within the thin film 28, the transferred optical wave 24 propagates through the thin film 28 without deflection after which the optical wave 24 is returned to the optical waveguide 12 until it appears at the other end thereof labelled OUTPUT END as the optical wave 24, undergoing no diffraction.

On the other hand, where the source 18 is in its ON state in which the elastic surface wave 22 is being supplied to the thin film 28 and where the angle formed between the directions of propagation of the elastic surface wave and optically guided wave 24 and 26 respectively is equal to a Bragg angle satisfying the Bragg condition, the optically guided wave 24 after having been introduced into the thin film 28 as in the above case is deflected through an angle of $2\theta$ (see FIG. 3) due to the Bragg diffraction. Then a diffracted optical wave 26 appears at the output of the optical waveguide 12 and is in a different position from the optical guided wave 24.

In this way, the high frequency source 18 can be brought into either its ON or its OFF state to control the supply of the elastic surface wave 22 to the thin film 28 whereby the optical guided wave 24 introduced into the optical waveguide 12 through input end can be switched to travel along either a path corresponding to the direction of incidence of the optical wave and era path deflected from the first-mentioned path at a predetermined angle within the output portion of the optical waveguide 12 as the case may be.

As an example, an arrangement such as shown in FIGS. 3, 4 and 5 were formed of the following components: the substrate was of fused quartz having a refractive index of 1.452 at a light wavelength of 8700 A in a vacuum and a photolithographic process was utilized to sputter Corning glass No. 7059 into a rectangular thin film 3 on one surface of the substrate to form an optical slab waveguide. The optical waveguide thus formed had a thickness of from 1.0 to 1.5 μm, a width from 50 to 100 μm and a refractive index of 1.53 at a light wavelength of 8700 A. A thin film was formed of chalcogenide glass, arsenic sulfide $As_2S_x$, where $x$ has a value of from 3 to 7, by vacuum evaporation. The resulting thin film had a film thickness of from 2,000 to 3,000 A and included one portion overlying the optical waveguide and having a length of from 2.5 to 3 mm. Also it had an acousto-optical figure-of-merit M of about $400 \times 10^{-18}$ $sec^3/g$, a refractive index of 2.35 at a light wavelength of 8700 A and a slope as above described in conjunction with FIG. 5 equal to or less than 1/1000. An interdigital transducer such as transducer 14 shown in FIG. 3 was formed by a thin film of zinc oxide (ZnO) to generate an elastic surface wave at a frequency of 130 MHz with a finger period of 20 μm for the associated interdigital electrodes.

When an optical wave emitted at a wavelength of 8700 A in a vacuum from a laser diode was used with the arrangement just described, the parameter Q was greater than $4\pi$ so that the acousto-optical interaction occurred under the Bragg condition. The resulting angle of deflection $2\theta$ between the straight guided wave and the deflected wave amounted to $2\theta = 1.6°$.

Thus it is seen that the present invention provides a thin-film optical switching device having a high light diffraction efficiency a low optical propagation loss and coupling loss while retaining the advantages of conventional devices. Further the present invention can be easily coupled to and integrated with other optical circuit elements.

While the present invention has been illustrated and described in conjunction with a single preferred embodiment thereof it is to be understood that numerous changes and modifications may be resorted to without departing from the spirit and scope of the present invention. For example, the substrate 10 may be formed of a crystal of ferroelectric material such as lithium niobate ($LiNbO_3$) or lithium tantalate ($LiTaO_3$), and the optical waveguide 12 having a high refractive index can be disposed on the surface of the substrate 10 through the out-diffusion of lithium (Li) or the diffusion of niobium (Nb), titanium (Ti) or copper (Cu). Alternatively, the optical waveguide 12 may be formed of a single crystal in the form of a thin film having a high refractive index through the use of a liquid or vapor epitaxial growth technique. With the substrate formed of a ferroelectric crystal, it is required only to dispose a pair of interdigital electrodes on that surface of the substrate having a crystal face suitable for the propagation of sound waves. This results in the advantage that the manufacturing process is simplified.

Further it will readily be appreciated that the thin film 28 may be of tellurium dioxide ($TeO_2$) glass and that the substrate may be any of a multitude of nonpiezoelectric materials having a small acousto-optical effect, for example, fused quartz, sapphire, YAG (yttrium aluminum garnet) etc.

Also it is to be understood that the thin film 28 is not required to be larger in width than the optical waveguide 12 and that the same may be just superposed on a predetermined portion of the optical waveguide, that is, the two may be identical in width to each other.

What we claim is:

1. A thin-film optical switching device comprising, in combination, a substrate having a first refractive index, an optical waveguide disposed on said substrate, said optical waveguide having a width sufficiently larger than that of an optical guided wave and also sufficient flare to prevent the optical guided wave from disturbing a diffracted guided optical wave, and further having a second refractive index higher than said first refractive index and a first film thickness, a thin film member overlying at least one portion of said optical waveguide, said thin film member extending in a light propagation direction and a distance from the point where the waveguide starts to flare greater than the width of the sound wave and having a third refractive index higher than said second refractive index, a relatively large value of acousto-optical figure-of-merit and a second film thickness, and an electromechanical transducer means on said substrate and positioned laterally of said waveguide for generating an elastic surface wave to propagate it through said thin film member, said transducer being oriented so that an angle $\theta$ formed between the wave front of an elastic surface wave generated by said transducer and an incident guided optical wave fulfills the requirement for the Bragg diffraction $$\sin \theta = \lambda o / 2n\Lambda$$

where $n$ designates the effective refractive index for the optical guided wave, $\Lambda$ the wavelength of the elastic surface wave and $\lambda o$ designates the wavelength of light in a vacuum, said second refractive index and first film thickness of said optical waveguide and said third refractive index and second film thickness of said thin-film member having respective values for imparting to the device a sufficiently high diffraction efficiency at an optical wavelength used with the device.

2. A thin-film optical switching device as claimed in claim 1 wherein said optical waveguide is a glass having the composition 61.0 mol % of $SiO_2$, 10.0 mol % of $Al_2O_3$, 19.0 mol % of $B_2O_3$ and 10.0 mol % of BaO, said glass being sputtered onto said first film thickness on said substrate.

3. A thin-film optical switching device as claimed in claim 1 wherein said substrate is a piezoelectric ferroelectric crystal.

4. A thin-film optical switching device as claimed in claim 1 wherein said substrate is a nonpiezoelectric material having a relatively small acousto-optical effect.

5. A thin-film optical switching device as claimed in claim 1 wherein said thin-film member is a glass selected from the group consisting of arsenic sulfide $As_2S_x$ where $x$ has a value of from 3 to 7, and tellurium dioxide ($TeO_2$) glass.

6. A thin-film optical switching device as claimed in claim 3 wherein said piezoelectric, ferroelectric crystal is a compound selected from the group consisting of lithium niobate ($LiNbO_3$) and lithium tantalate ($LiTaO_3$), and said optical waveguide is formed by diffusing an element selected from the group consisting of lithium (Li) niobium (Nb), titanium (Ti) and copper (Cu) on said substrate of said piezoelectric ferroelectric crystal.

7. A thin-film optical switching device as claimed in claim 1 wherein said substrate is a ferroelectric crystal and said optical waveguide is a single crystal in the form of a thin-film formed on said crystal substrate by an epitaxial growth technique.

8. A thin-film optical switching device as claimed in claim 1 wherein said thin film member has at each of the opposite edges in the direction in which an optically guided wave travels within said optical waveguide a slope not more than 1/1000.

9. A thin-film optical switching device comprising, in combination, a substrate of fused quartz having a first refractive index $n_o$, an optical waveguide disposed on said substrate having a width sufficiently larger than that of an optical guided wave and also sufficient flare to prevent the optical guided wave from disturbing a diffracted guided optical wave and being a glass having the composition 61.0 mol % of $SiO_2$, 10.0 mol % of $Al_2O_3$, 19.0 mol % of $B_2O_3$ and 10.0 mol % of BaO, said glass having a second refractive index $n_1$, a thin-film member overlying at least one portion of said optical waveguide extending in a light propagation direction and a distance from the point where the waveguide starts to flare greater than the width of the sound wave and being of a chalcogenide glass of the $As_2S_x$ type, where $x$ has a value of from 3 to 7, and having a third refractive index $n_2$, said refractive indices being in the relationship $n_0 < n_1 < n_2$, and an electromechanical transducer means on said substrate and positioned laterally of said waveguide for generating an elastic surface wave for propagating through said thin-film member, said transducer being oriented so that an angle $\theta$ formed between the wave front of an elastic surface wave generated by said transducer and an incident guided optical wave fulfills the requirement for the Bragg diffraction $$\sin \theta = \lambda o / 2n\Lambda$$

where $n$ designates the effective refractive index for the optical guided wave, $\Lambda$ the wavelength of the elastic surface wave and $\lambda o$ designates the wavelength of light in a vacuum.

10. A thin-film optical switching device comprising, in combination, a substrate of fused quartz having a refractive index of 1.45 at an optical wavelength of 8,700 A, an optical waveguide disposed on said substrate and having a width sufficiently larger than that of an optical guided wave and also sufficient flare to prevent the optical guided wave from disturbing a diffracted guided optical wave, and a film thickness of from 1.0 to 1.5 μm, said optical waveguide being a glass having the composition 61.0 mol % of $SiO_2$, 10.0 mol % of $Al_2O_3$, 19.0 mol % of $B_2O_3$ and 10.0 mol % of BaO, said glass having a refractive index of 1.53 at said wavelength, a thin-film member overlying at least one portion of said optical waveguide and extending in a light propagation direction and a distance from the point where the waveguide starts to flare greater than the width of the sound wave and having a thickness of from 2,000 to 3,000 A, said thin-film member being of a chalcogenide glass of the $As_2S_x$ type where $x$ has a value of from 3 to 7 having a refractive index of 2.35 at said wavelength, said thin-film member having at each of the opposite edges thereof in a direction in which an optically guided wave travels within said optical waveguide a slope not higher than 1/1000, and an electromechanical transducer means on said substrate and positioned laterally of said waveguide for generating an elastic surface wave for propagating through said thin-film member, said transducer being oriented so that an angle $\theta$ formed between the wave front of an elastic surface wave generated by said transducer and an incident guided optical wave fulfills the requirement for the Bragg diffraction $$\sin \theta = \lambda o / 2n\Lambda$$

where $n$ designates the effective refractive index for the optical guided wave, $\Lambda$ the wavelength of the elastic surface wave and $\lambda o$ designates the wavelength of light in a vacuum.

* * * * *